Jan. 18, 1966 J. G. MacARTHUR 3,230,383

CLOCK PULSE COUNTER

Filed March 12, 1962 4 Sheets-Sheet 1

JOHN GERARD MacARTHUR
INVENTOR.

BY Arthur Freilich
AGENT

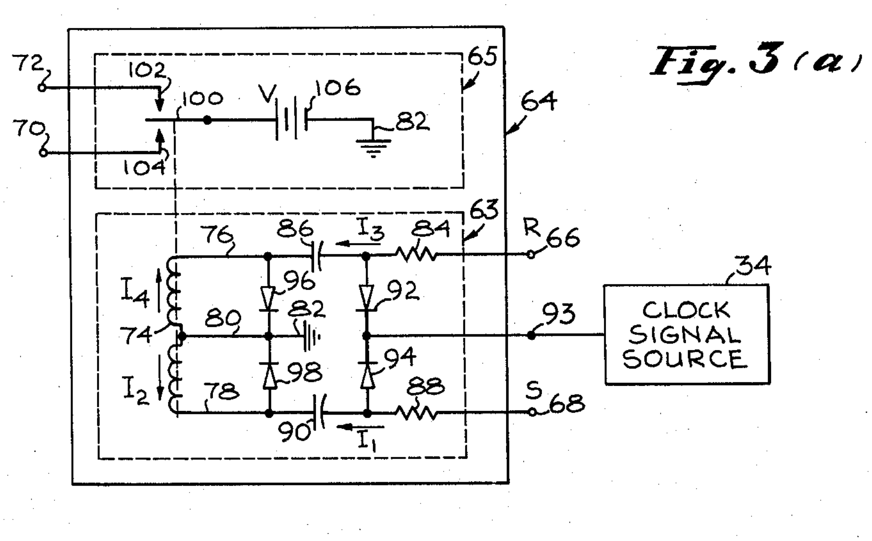
Fig. 3(a)
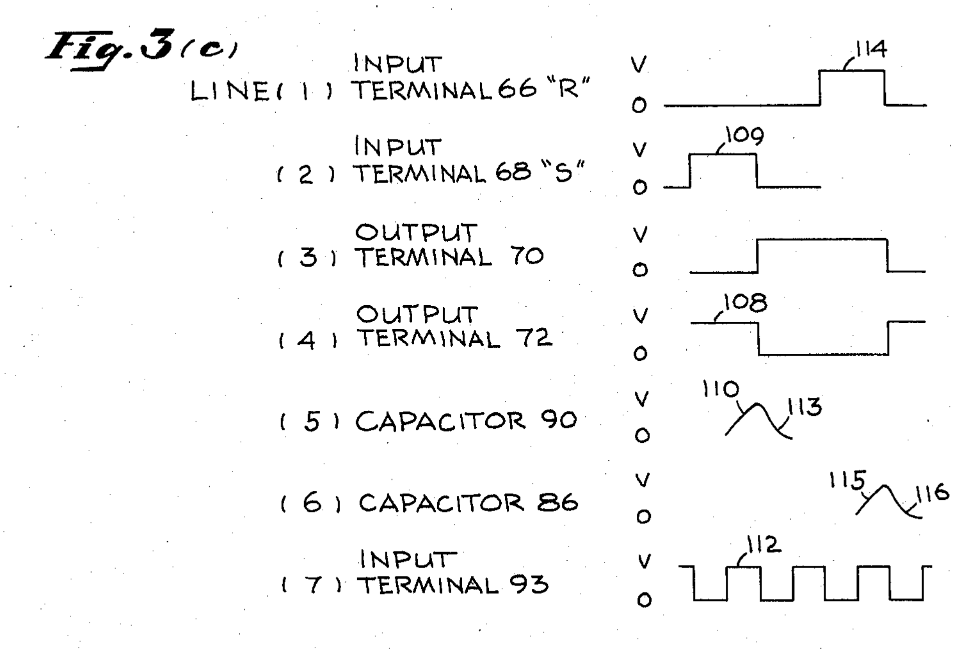
Fig. 3(c)
TRUTH TABLE
| | R | S | Qn+1 |
|---|---|---|---|
| LINE (1) | 0 | 0 | Qn |
| (2) | 0 | 1 | 1 |
| (3) | 1 | 0 | 0 |
| (4) | 1 | 1 | ? |
Fig. 3(b)
JOHN GERARD MACARTHUR
INVENTOR.
BY Arthur Freilich
AGENT Jan. 18, 1966 J. G. MacARTHUR 3,230,383

CLOCK PULSE COUNTER

Filed March 12, 1962 4 Sheets-Sheet 3

JOHN GERARD MacARTHUR
INVENTOR.

BY Arthur Frelich
AGENT

Jan. 18, 1966 J. G. MacARTHUR 3,230,383

CLOCK PULSE COUNTER

Filed March 12, 1962 4 Sheets-Sheet 4

INVENTOR.
JOHN GERARD MACARTHUR
BY Arthur Frelich
AGENT

United States Patent Office 3,230,383

Patented Jan. 18, 1966

3,230,383
CLOCK PULSE COUNTER

John Gerard MacArthur, Canoga Park, Calif., assignor, by mesne assignments, to The Bunker-Ramo Corporation, Stamford, Conn., a corporation of Delaware Filed Mar. 12, 1962, Ser. No. 178,931
9 Claims. (Cl. 307—38)

This invention relates generally to time indicating devices and more particularly to an electronic clock device employing digital techniques and circuitry.

Frequently in computer applications, particularly in the applications of computers for process control, apparatus must be provided to make available timing information essential to the normal operation of the process. In order to properly perform this function, a digital clock capable of being read by a computer and other digital apparatus is used to keep track of and indicate time of day. A clock used for this purpose must be highly reliable, highly accurate, and generally capable of supplying high-current electrical output signals representing both binary-coded decimal and decimal time readouts. In addition, of course, it is desirable that the clock be relatively inexpensive as to both its original price and maintenance costs.

The digital clocks presently being utilized for the purposes indicated are of two basic types: (1) those using stepping relays and (2) those using solid state counters and decoders. Although stepping relay types are not excessively expensive, experience in the field has shown that they are relatively unreliable under certain conditions.

On the other hand, solid state digital clocks using flip-flop counters and decoders have proven to be extremely reliable. However, units of this type capable of providing a current sufficiently high to operate various loads such as certain types of displays are extremely expensive.

Accordingly, it is an object of this invention to provide a digital clock, particularly useful in computer applications, which is simpler, more reliable, and less expensive than heretofore known clocks utilizing relays.

It is an additional object of this invention to provide a digital clock which is simpler and considerably less expensive than heretofore known clocks of comparable capabilities employing solid state counters and decoders.

It is still an additional object of this invention to provide a digital clock capable of outputting both binary-coded decimal and decimal electrical information at relatively high current values.

In fulfillment of the above objects, the digital clock disclosed herein has as a feature thereof a novel integrated apparatus which performs both counting and decoding functions.

In its more general form, the present invention comprises a clock for indicating time of day utilizing a specialized integrated counter-decoder apparatus. In accordance with the invention, advantage is taken of the fact that the previously independent counting and decoding functions embodied in most prior art digital clock apparatus can be integrated in a circuit arrangement wherein stages of a relay tree comprise the output sections of relay flip-flops which are connected to count. The input to each of the flip-flop stages is taken from the stage of the tree comprising its own output.

More particularly, a preferred embodiment of the counter-decoder apparatus utilizes a number of stages of relay flip-flops, each flip-flop including an input and control section and an output section. The input and control section includes a pair of information input terminals, a clock signal input terminal, and a center tapped relay coil defining a pair of windings. The output section includes a pair of output terminals connected to a pair of relay contacts preferably of the mercury wetted type, and a latching armature, having a power supply connected thereto, selectively movable into engagement with either the first or second contacts of the pair of contacts, in response to the respective energization of the first and second windings of the pair of windings. Determination of which winding is energized depends upon the information applied to the information input terminals. Energy storage means such as capacitors are connected between each of the information input terminals and the coil and permit the flip-flop to assume the operational characteristics of an R–S flip-flop. Accordingly, the output terminals can be connected back to the information input terminals permitting the power supply to charge the capacitors through the armature. The flip-flop can be caused to change state upon each application of the clock input signal by causing the charged capacitor to discharge through one of the windings.

In a first clock embodiment, the counting and decoding functions are performed by connecting a plurality of flip-flop stages in succession and providing the output section of each with a number of pairs of relay contacts equal to twice that of the immediately preceding stage. A latching armature is associated with each pair of relay contacts and all the armatures associated with the contacts of each stage are ganged together and responsive to energization of the windings of that stage. The armature of the first stage is connected to a power supply and the armatures of each succeeding stage are connected to one of the relay contacts of the immediately preceding stage. One pair of contacts in each stage is coupled back to the input terminals of that stage. Since, the state of any flip-flop stage changes upon the application of the clock input signal thereto only when a capacitor thereof has been charged through the contacts of the preceding stages from the power supply connected to the armature of the first stage, the state of each flip-flop changes only one-half as often as that of its preceding stage.

Other objects and advantages, which will subsequently become apparent, reside in the details of circuitry and operation as more fully hereinafter described and claimed, further reference being made to the accompanying drawings forming a part hereof, wherein like identifying numerals refer to like parts throughout the several figures, and in which:

FIG. 3(*a*) is a schematic diagram of a relay flip-flop which can be utilized in the counter-decoder apparatus of FIGS. 4 and 5;

FIG. 3(*b*) is a truth table indicating the logical characteristics of the flip-flop of FIG. 3(*a*);

FIG. 3(*c*) is a diagram showing waveforms at various points of the circuit of FIG. 3(*a*), illustrated to facilitate the explanation and understanding of the operation of the flip-flop;

Figure 1:
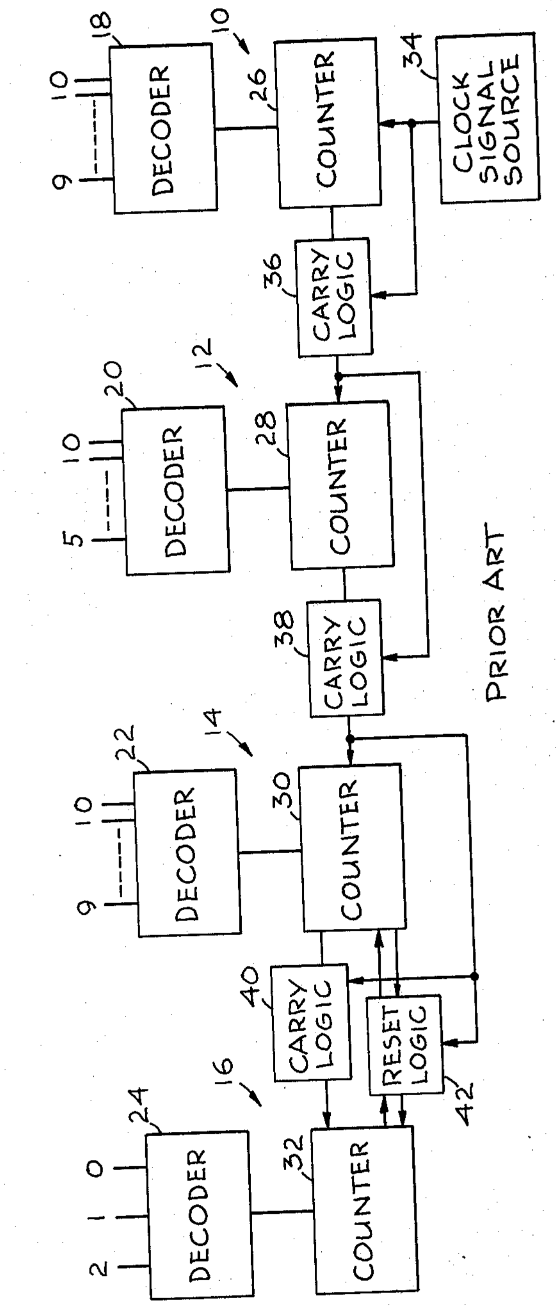
FIGURE 1 is a block diagram of a conventional solid state digital clock illustrating the independence between the counter and decoder circuits.

With continuing reference to the drawings, attention is initially called to FIG. 1 wherein a block diagram of a conventional solid state digital clock is illustrated. In order to indicate the time of day in the decimal system, it is necessary that means be provided for expressing four distinct decimal numbers; i.e., the tens and units place of the number of minutes to be indicated and the tens and units place of the number of hours to be indicated; e.g., 10:17 wherein the decimal numeral "7" represents the units place of the number of minutes, the decimal numeral "1" represents the tens place of the number of minutes, etc. Accordingly, the typical prior art solid state clock shown in FIG. 1 includes four clock stages 10, 12, 14, 16 to respectively indicate the minutes units and tens places and the hours units and tens places. The clock stages 10, 12, 14, 16 each respectively include a decoder 18, 20, 22, 24 and a counter 26, 28, 30, 32.

The counters 26, 28, 30, 32 may comprise conventional flip-flop counters having a sufficient number of flip-flop stages to form the number of unique state combinations necessary to express the various possible counts for the particular clock stage. For instance, the counter 26 of stage 10 must employ four flip-flops inasmuch as it must represent ten unique counts corresponding to the numbers 0 through 9 which comprise the successive counts appearing in the units place of the number of minutes to be indicated. The counter 26 of stage 10 is responsive to clock signals recurring at the rate of one per minute derived from course 34, such that upon the application of each signal, its count is incremented by one. The output of counter 26 can be in binary-coded decimal form. In order to convert from binary-coded decimal to decimal, decoder 18 having ten output terminals is employed. Decoder 18 performs the function of recognizing each of the unique state combinations assumed by counter 26 and in response thereto energizes one of its ten output terminals uniquely associated with each combination. Decoder 18 can comprise a series of ten AND gates, each connected to the output of counter 26 and each uniquely responsive to one state combination. The output terminals of the decoder comprise the output lines of the AND gates.

Carry logic 36 couples the counter 26 of stage 10 to the counter 28 of stage 12 and functions to increment the counter 28 once for every cycle of the counter 26. The carry logic 36 can comprise a logical gate responsive to the output of source 34 and the output of counter 26 representative of the decimal numeral "9." In this manner, clock stages 10 and 12 can progress from "09" minutes to "10" minutes. Whereas counter 26 must have at least four flip-flops to represent the ten possible counts appearing in the units place of the number of minutes to be indicated, the counter 28 need employ only three flip-flops inasmuch as six state combinations are sufficient to represent the possible counts appearing in the tens place of the number of minutes to be indicated. The output of counter 28 in binary-coded decimal form is connected to decoder 20 to convert to decimal form.

Carry logic 38 coupled between counter 28 and counter 30 of stage 14 functions similarly to carry logic 36. Carry logic 38 is responsive to a representation of decimal numeral "5" by counter 28, a representation of decimal numeral "9" by counter 26, and the output of source 34 to increment counter 30 by one. Accordingly, it will be appreciated that the inputs to carry logic 38 can be taken from the outputs of counter 28 and carry logic 36.

Similarly, carry logic 40 couples counter 30 to counter 32 of stage 16. Whereas ten counts must be represented by counter 30 thereby requiring four flip-flops, only three need be represented by counter 32 inasmuch as clock stages 14 and 16 need only count from 0 through 23 hours and accordingly counter 24 requires only two flip-flops. Carry logic 40 functions to increment counter 32 from count 0 to count 1 after the completion of a first cycle of counter 30, and from count 1 to count 2 upon the completion of a second cycle of counter 30. Inasmuch as it is necessary that both counters 30 and 32 return to an indication of count 0 after they indicate "23" and counters 28 and 26 complete their cycles, reset logic

42 is provided and is responsive to a representation of that numeral to reset counters 30 and 32 to count 0.

Figure 2:
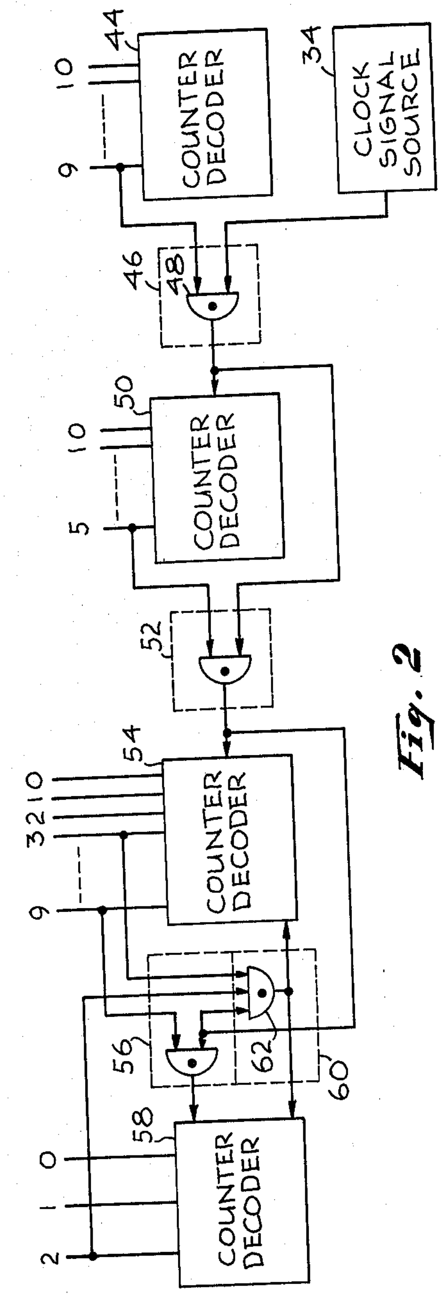
FIG. 2 is a block diagram of a digital clock embodying the present invention illustrating the integration of the decoding and counting functions into a single apparatus.

Whereas the conventional clock described in FIG. 1 contains stages employing both counters and decoders, applicant's invention illustrated in block form in FIG. 2 illustrates structure in which the counting and decoding functions are effectively integrated. Accordingly, the source 34 of recurring signals causes counter-decoder apparatus 44 to step through its cycle of ten counts successively energizing its ten output terminals.

Carry logic 46 containing AND gate 48 is responsive to the energization of output terminal "9" of apparatus 44 and the signals from source 34 to increment counter-decoder apparatus 50 by one. It should be appreciated that counter-decoder apparatus 44 and 50 are utilized to respectively indicate the units and tens place of the number of minutes to be indicated and accordingly have respective cycles of ten and six counts.

Carry logic 52 is responsive to complete cyclings of counter-decoder apparatus 44 and 50 to increment by one counter-decoder apparatus 54 representing the units place of the number of hours to be indicated. Similarly, carry logic 56 is responsive to complete cyclings of counter-decoding apparatus 44, 50 and 54 to increment counter-decoder apparatus 58 by one. Reset logic 60 comprising AND gate 62 is responsive to the coincidence of count 2 of apparatus 58, count 3 of apparatus 54, and cycle completions of apparatus 44 and 50, to reset both apparatus 54 and apparatus 58 to count 0.

Counter-decoder apparatus 44, 50, 54, 58 are all identical in principle and operation. Their implementations differ only to the extent of including a different number of flip-flop stages. Prior to considering the complete implementation of a typical counter-decoder apparatus, attention is directed to FIG. 3(*a*) wherein the details of a relay flip-flop used in the apparatus are illustrated.

Relay flip-flop 64 includes an input and control section 63 and an output section 65. Section 63 includes a pair of information input terminals 66 and 68 which may more appropriately be respectively designated "R" and "S" inasmuch as it will be shown that the flip-flop has the characteristics of a conventional RS (or set-reset) flip-flop. Section 65 includes a pair of output terminals 70 and 72 which are arbitrarily respectively defined as the true and false output terminals, it being further defined that a positive voltage level V represents a true logical proposition and ground potential represents a false logical proposition. The flip-flop will be considered in a true state if terminal 70 is at positive potential V and terminal 72 is at ground and in a false state if terminal 72 is at positive potential V and terminal 70 is at ground.

Sections 63 further includes a relay coil 74 having first and second end terminals 76 and 78 and a center tap 80 grounded at 82. A resistor 84 and capacitor 86 are serially connected between input terminal 66 and first end terminal 76. Likewise, a resistor 88 and capacitor 90 are serially connected between input terminal 68 and second end terminal 78. Opposed diodes 92 and 94 have their anodes respectively connected to the junctions defined between resistor 84 and capacitor 86, and resistor 88 and capacitor 90. Opposed diodes 96 and 98 have their anodes connected respectively to end terminals 76 and 78 and their cathodes connected to ground 82. A source of recurring pulse signals 34 is connected to terminal 93 at the junction defined between the cathodes of diodes 92 and 94.

Section 65 further includes a latching armature 100 which is movable in response to the energization of coil 74 and which is disposed so as to be engageable with relay contact 102, connected to output terminal 72, when coil 74 is energized in a first direction, and movable into engagement with relay contact 104 connected to output terminal 70, when coil 74 is energized in a second direction. A source 106 of positive voltage V is connected between armature 100 and ground 82.

In order to facilitate an understanding of the operation of flip-flop 64, attention is called to the truth table of FIG. 3(*b*) and the waveforms of FIG. 3(*c*) which should be considered along with the schematic diagram of FIG. 3(*a*). As previously pointed out, the positive voltage level V will be considered to represent a true logical proposition and ground potential will be considered to represent a false logical proposition. The binary digits "1" and "0," used in FIG. 3(*b*) for convenience, correspond respectively to the true and false propositions. The output of source 34 is a recurring pulse which varies between the positive voltage level V (true) and ground (false) and is represented by line 7 in FIG. 3(*c*).

Assume initially that armature 100 is in its upper position in engagement with relay contact 102. Accordingly, the positive voltage level V is applied to output terminal 72 as shown at 108 in line 4 of FIG. 3(*c*) and the flip-flop is considered to be false. As long as no signal is applied to either of the input terminals 66 or 68, no current will flow through coil 74 and armature 100 will remain in its upper position and the flip-flop will stay false. Likewise, if the flip-flop were true and no signal was applied to the input terminals 66, 68, the flip-flop would remain true. This action is represented by the first line of the truth table shown in FIG. 3(*b*) wherein it is indicated that if neither the R and S inputs are true, the output Q at time $n+1$ will be the same at time $n$.

If on the other hand, the flip-flop is false and a positive voltage level or true logical level is applied to input terminal 68, shown at 109 in line 2 of FIG. 3(*c*), a current $I_1$ will flow through resistor 88, capacitor 90, and diode 98 to ground 82 if the output of source 34 is at positive voltage level V thereby back-biasing diode 94. Current $I_1$ charges the capacitor 90 as indicated at 110 on line 5 of FIG. 3(*c*). When the output of source 34 falls to ground from voltage level V as indicated at 112 on line 7 of FIG. 3(*c*), capacitor 90 begins to discharge (shown at 113 in line 5 of FIG. 3(*c*)) through diode 94 establishing a current $I_2$ which is drawn through coil 74 from center tap 80 to the second end terminal 78. Energization of coil 74 by current $I_2$ pulls armature 100 down into engagement with relay contact 104 raising the potential of output terminal 70 to V and lowering the potential of output terminal 72 to ground. This action therefore switches the flip-flop from a false to a true state and is represented by line 2 of the truth table. If the flip-flop had been true when voltage level V was applied to input terminal 68, the flip-flop would not have changed state. It is pointed out that although the circuit could function in the absence of diodes 96 and 98, these elements permit capacitors 86 and 90 to charge faster and also serve to minimize any inductive kick encountered which could possibly falsely switch the flip-flop.

In opposite manner, if voltage level V is now applied to input terminal 66, shown at 114 in line 1 of FIG. 3(*c*), and if the output of source 34 is at voltage level V, a current $I_3$ will be established through resistor 84, capacitor 86 and diode 96 to ground 82. Accordingly, capacitor 86 becomes charged as indicated at 115 on line 6 of FIG. 3(*c*). When the output of source 34 falls to ground, diode 92 becomes forward biased and capacitor 86 discharges, shown at 116 in line 6 of FIG. 3(*c*) causing current $I_4$ to flow through coil 74 and in this manner causing armature 100 to move into its upper position into engagement with relay contact 102. This action is represented by line 3 of the truth table. If the flip-flop had been false when voltage level V was applied to input terminal 66, the flip-flop would not have changed state.

If the voltage levels V are applied simultaneously to both input terminals 66 and 68, an intermediate action dependent upon the parameters of the particular circuit will ensue. This indeterminate action is represented by line 4 of the truth table of FIG. 3(*b*).

Figure 4:
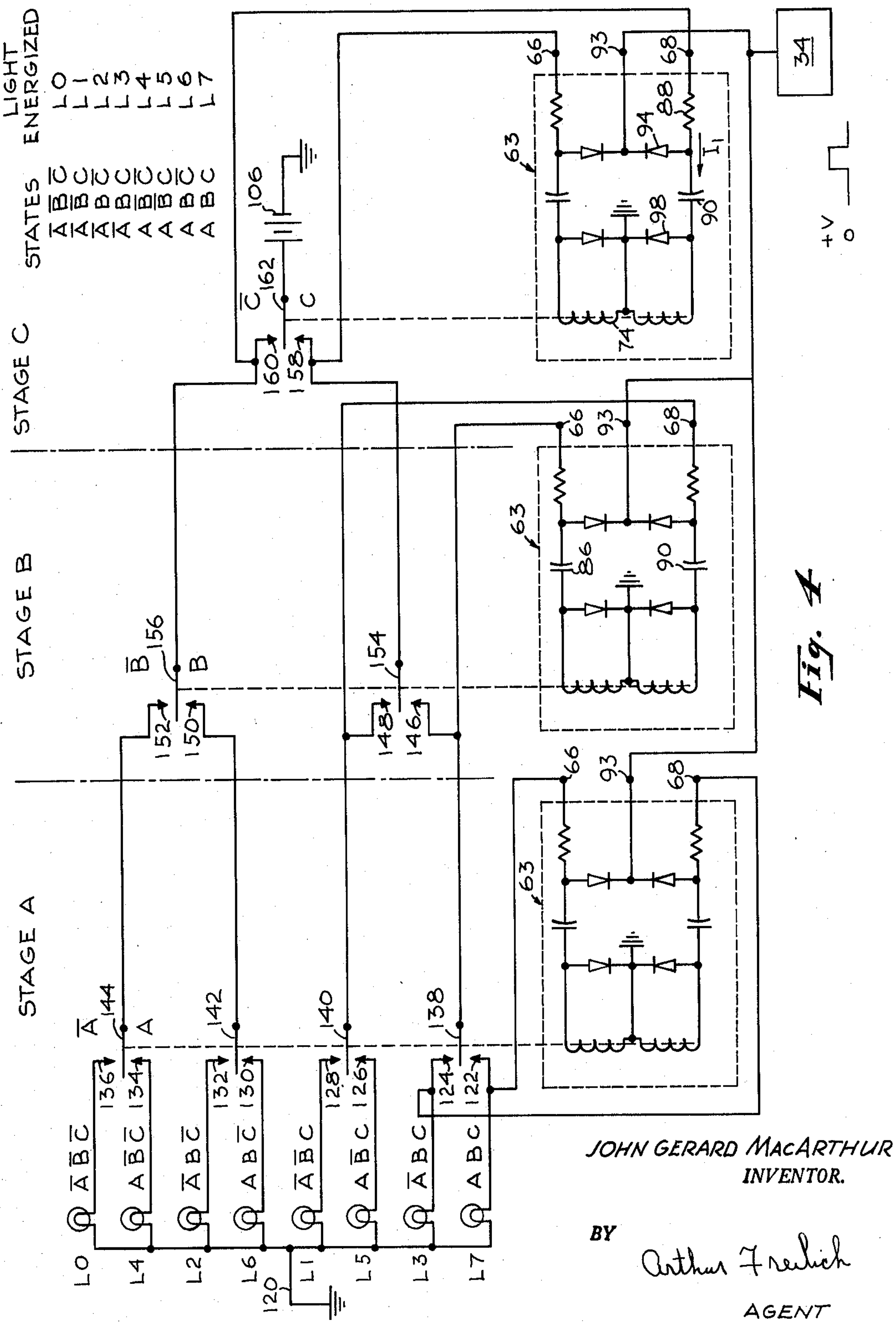
FIG. 4 is a schematic diagram illustrating a first embodiment of the counter-decoder apparatus utilized in the digital clock of FIG. 2.

Attention is now called to FIG. 4 wherein a first embodiment of a typical counter-decoder apparatus is illustrated. Although the implementation shown permits sequencing through a cycle of eight counts, the principles to be described can be extended to permit a greater or lesser count cycle as desired. For purposes of illustration, it is hypothesized that the function of the apparatus is to sequentialy energize each of the light sources L0–L7 in response to the recurring clock signals from source 34.

A relay tree is provided and includes stages A, B and C. Stage A of the relay tree includes four pairs of relay contacts, the individual contacts being designated respectively as 122 and 124, 126 and 128, 130 and 132, and 134 and 136. Armatures 138, 140, 142 and 144 are respectively associated with the four pairs of contacts. The armatures are ganged together so that all are either engaged with the upper contact of its associated contact pair or all are engaged with the lower contact of its associated contact pair. Armatures 138, 140, 142 and 144 are respectively connected to relay contacts 146, 148, 150 and 152 of stage B. Contacts 146 and 148 form a contact pair having associated therewith armature 154 while contacts 150 and 152 form a contact pair having associated therewith armature 156. In turn, armatures 154 and 156 are connected to relay contacts 158 and 160 of stage C. Armature 162 associated with the contacts 158 and 160 is connected to a source 106 of positive potential V. Each of light sources L0–L7 is respectively connected between a common ground 120 and relay contacts 136, 128, 132, 124, 134, 126, 130 and 122.

In order to sequentially energize each of the light sources, an input and control section 63 of flip-flop 64 of FIG. 3(*a*) described above is associated with each of the relay tree stages. All of the armatures of each stage are movable in response to the energization of the relay coil 74 of that stage. As previously pointed out, when the armatures of each stage are in their upper position, the stage will be considered false and the output of, e.g., stage C will be noted as $\overline{C}$. If the armatures of a stage are in their lower position, the stage will be considered true and the output of, e.g., stage C will be noted as C.

Relay contacts 158 and 160, comprising the output of stage C are connected respectively to input terminals 66 and 68 of section 63 of stage C. Similarly, contacts 150 and 152 of stage B are connected respectively to terminals 66 and 68 of section 63 of stage B. Similarly, contacts 122 and 124 are respectively connected to input terminals 66 and 68 of section 63 of stage A. In addition, the output of signal source 34 is connected to terminal 93 of each of sections 63.

It is initially assumed that stages A, B and C are all false (represented by $\overline{A}\,\overline{B}\,\overline{C}$). It will be appreciated that in this state combination, all of the armatures are in their uppermost position and light source L0 will be energized from source 106 through the closed circuit comprising armature 162, contact 160, armature 156, contact 152, armature 144, contact 136, to ground 120. In this state, charging current $I_1$ is caused to flow through capacitor 90 from source 106, through armature 162, contact 160, resistor 88 and diode 98 to ground. When the output potential of source 34 falls from positive potential V to ground, capacitor 90 discharges causing a current $I_2$ to flow through coil 74 from center tap 80 to second end terminal 78 and through diode 94. The current $I_2$ through the coil pulls armature 162 out of engagement with contact 160 and into engagement with contact 158. Stage C therefore becomes true and the output state of the relay tree may then be represented by $\overline{A}\,\overline{B}\,C$, accordingly energizing light source 11.

With state C true and stages A and B false, capacitor 86 of stage C and capacitor 90 of stage B charge so long as the output of source 34 is at positive potential V. When the output of source 34 falls to ground, the capacitors discharge and switch their respective stages so that stage B becomes true and stage C becomes false. This new state is represented by $\overline{A}$ B $\overline{C}$ and accordingly causes the energization of light source L2. In like manner, a different light source is energized each time the output of source 34 falls to ground. The state cycle table shown in FIG. 4 indicates the successive states assumed by the stages A, B and C and the light sources energized in each state.

Figure 5:
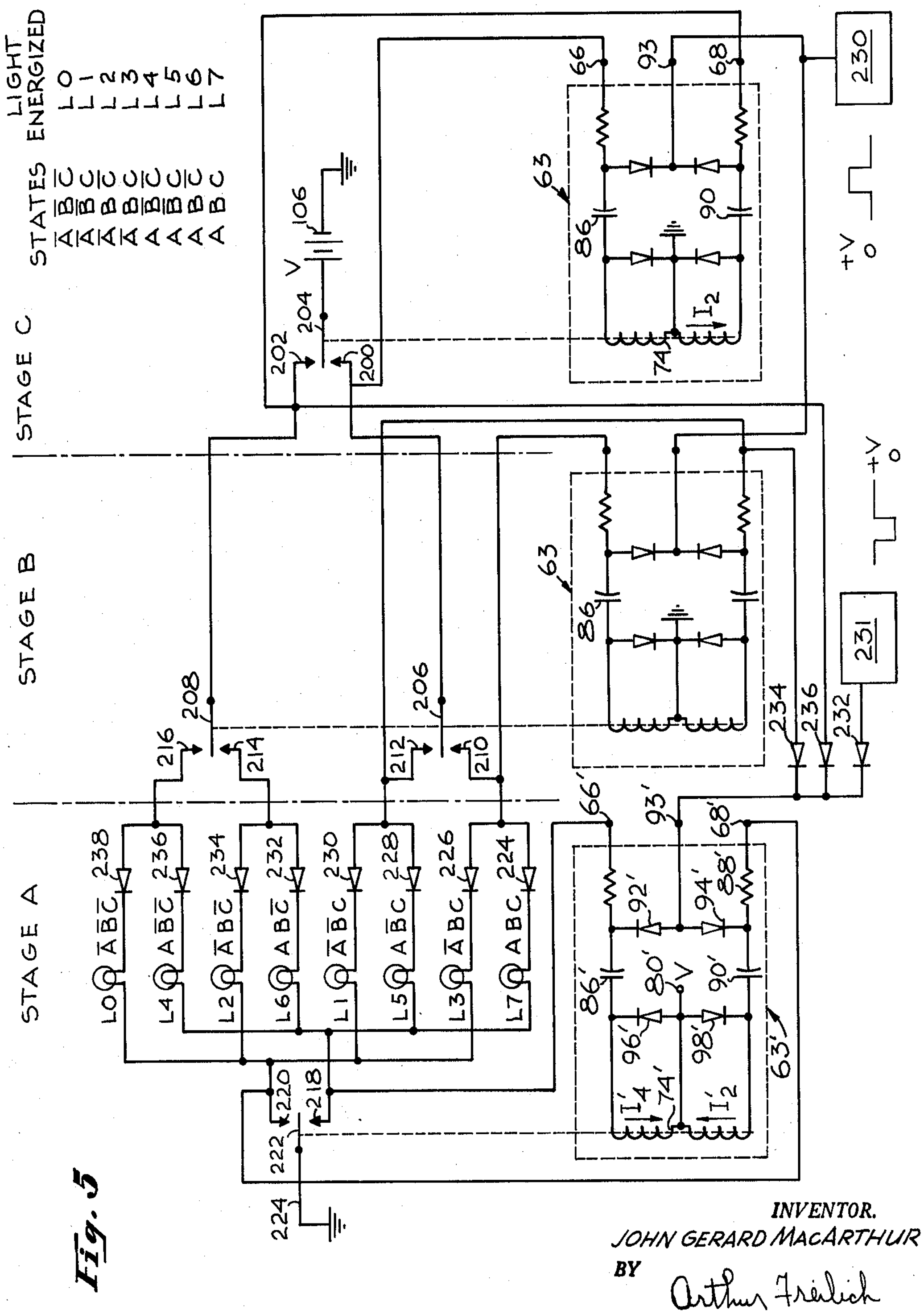
FIG. 5 is a schematic diagram illustrating a second embodiment of the counter-decoder apparatus utilized in the digital clock of FIG. 2.

Attention is now called to FIG. 5 wherein a second embodiment of a typical counter-decoder apparatus is illustrated. Again it is hypothesized that it is desired to sequentially energize each of eight light sources L0–L8. The apparatus again comprises three stages designated A, B, C. The apparatus of FIG. 5 differs from that of FIG. 4 by being less costly due to the reduction of the pairs of relay contacts required. In addition, FIG. 5 demonstrates the versatility of the principle of the relay flip-flop of FIG. 3(*a*) inasmuch as the apparatus of FIG. 5 shows how flip-flops of opposite polarity can be simply coupled together.

Stage C includes a pair of relay contacts 200 and 202 which are associated with an armature 204 connected to a source 106 of positive potential V. Contacts 200 and 202 are connected to armatures 206 and 208 of stage B. Armature 206 is associated with contacts 210 and 212 and armature 208 is associated with contacts 214 and 216. Light source L0 is connected through diode 238 between contact 220 of stage A and contact 216 of stage B. Light source L4 is connected through diode 236 between contact 218 of stage A and contact 216 of stage B. Similarly, light sources L2, L1 and L3 are respectively connected through diodes 234, 230, 226 and between contact 220 and contacts 214, 212 and 210. Light sources L6, L5 and L7 are respectively connected through diodes 232, 228, 224 and between contact 218 and contacts 214, 212 and 210. Armature 222 is connected to ground 224 and is associated with contacts 218 and 220.

Input and control sections 63, as shown in FIG. 3(*a*) form portions of stages B and C. More particularly, contacts 200 and 202 are respectively connected to input terminals 66 and 68 in stage C and contacts 210 and 212 are connected to input terminals 66 and 68 of stage B. A first source of recurring pulse signals 230 is connected to terminals 93 of section 63 of stages B and C.

In lieu of section 63 as detailed in FIG. 3(*a*), stage A employs section 63′ to control armature 222. The principles of operation of stage 63′ are similar to those described for section 63. However, section 63′ differs from section 63 by virtue of the fact that the center tap 80′ of coil 74′ is connected to a source of positive potential V rather than ground. Diodes 92′, 94′, 96′, and 98′ correspond to the similarly numbered components in section 63 but, however, their polarities are reversed in section 63′. Contacts 218 and 220 are connected respectively to input terminals 66′ and 86′. A source 231 of recurring clock signals 180° out of phase with the signals from source 230 is connected through diode 232 to terminal 93′ of section 63′. In addition, contact 212 of stage B is connected through diode 234 and contact 202 of section C is connected through diode 236 to terminal 93′.

As before, a stage will be considered false when the armatures thereof are in their upper positions and true when the armature thereof are in their lower positions. Assume initially that all of the armatures are in their upper positions as represented by the expression $\overline{A}$ $\overline{B}$ $\overline{C}$. It will be appreciated that under these circumstances light source L0 will be illuminated. With the armatures in this position, capacitor 90 of stage C will charge so long as the output of source 230 is at positive potential V. When the output of source 230 falls to ground potential a current $I_2$ is drawn through relay coil 74 causing armature 204 to disengage from contact 202 and engage contact 200. The new state is represented by the expression $\overline{A}$ $\overline{B}$ C and it will be appreciated that light source L1 will become illuminated. Capacitor 86 of stage B and capacitor 90 of stage C will then charge so long as the output of source 230 is at positive potential V and upon the next fall of the output of source 230 to ground, will switch the flip-flops to state $\overline{A}$ B $\overline{C}$ thereby illuminating light source L2. Capacitor 90 of stage C will then charge and the subsequent discharge thereof will switch the apparatus to state $\overline{A}$ B C and illuminate light source L3.

It will be noted that through the first four counts (L0, L1, L2, L3), stage A has been inactive, remaining false. This occurs from the fact that so long as positive potential V is applied to terminal 93′, stage A is inhibited from switching. Positive potential V is applied to terminal 93′ through diode 236 during states when stage C is false and through diode 234 during states when stage C is true and stage B is false. No inhibiting signal is applied to terminal 93′ when both stages B and C are true and accordingly, when this occurs, stage A can switch. The inhibiting voltage applied to terminal 93′ prevents stage A from switching because it prevents capacitors 86′ and 90′ from being charged. When positive potential V is not applied through diodes 234 and 236 to terminal 93′ and when the output of source 231 falls to ground, capacitor 90′ will charge if stage A is in state $\overline{A}$ and capacitor 86′ will charge if stage A is in state A. When the output of source 231 rises to positive potential V, the charged capacitor, either 86′ or 90′ will discharge so as to respectively establish currents $I_4'$ or $I_2'$ to cause the armature 224 to switch positions. The state cycle table shown in FIG. 5 expresses the complete sequence of states of the counter-decoder apparatus of FIG. 5 and the light source illuminated during each state.

From the foregoing, it will be appreciated that applicant has provided herein a clock employing digital apparatus and techniques and utilizing an integrated apparatus for performing both counting and decoding functions. More particularly, applicant has herein suggested the utilization of stages of a relay tree as output sections for relay flip-flops coupled together to form a counter. The apparatus so formed demonstrates how counting and decoding functions can be performed more reliably and at a lower cost than heretofore performed.

What is claimed is:

1. In combination with a source of recurring clock pulses and a plurality of load terminals, apparatus responsive to said clock pulses for sequentially energizing each of said load terminals comprising:

(a) successive flip-flop stages each including a pair of input terminals, a pair of output terminals, a relay coil and a plurality of relay contacts;

(b) the first of said stages having one pair of relay contacts and each of said succeeding stages having twice the number of contacts as the stage immediately preceding it;

(c) each of said stages including an armature positioned adjacent each pair of relay contacts in said stage and controlled by the coil thereof and movable into engagement with each of the contacts of the pair;

(d) said pair of output terminals of each stage connected to a pair of relay contacts thereof;

(e) means connecting the pair of output terminals of each stage to the pair of input terminals thereof;

(f) means connecting said load terminals to the output terminals of the last of said stages.

2. In combination with a source of recurring pulse signals, a clock responsive to said pulse signals for indicating the time of day comprising:

(a) a first clock stage having ten output terminals and including means responsive to said pulse signals for sequentially energizing said terminals for indicating the units place of the number of minutes to be indicated;

(b) a second clock stage having six output terminals and including means responsive to said pulse signals for sequentially energizing said terminals for indicating the tens place of the number of minutes to be indicated;

(c) a third clock stage having ten output terminals and including means responsive to said pulse signals for sequentially energizing said terminals for indicating the units place of the number of hours to be indicated;

(d) a fourth clock stage having three output terminals and including means responsive to said pulse signals for sequentially energizing said terminals for indicating the tens place of the number of hours to be indicated;

(e) carry means interconnecting said clock stages enabling said second clock stage once for every cycle of said first clock stage, said third clock stage once for every cycle of said second clock stage and said fourth clock stage once for every cycle of said third clock stage;

(f) reset means for resetting said third stage after energization of only four of its ten terminals when the last terminal of said fourth stage is energized;

(g) and each of said clock stages comprising a counter-decoder apparatus including a plurality of relay flip-flops.

3. The combination of claim 2 wherein each flip-flop includes a relay coil; a pair of input terminals; at least one pair of relay contacts; an armature positioned adjacent each pair of contacts controlled by said coil and selectively movable into engagement with each of said contacts and means connecting one pair of said relay contacts to said input terminals.

4. The combination of claim 3 wherein each flip-flop additionally includes capacitive storage means connected to said coil and capable of being discharged through said coil for moving said armature.

5. In combination with a source of recurring pulse signals and a relay tree of *n* stages, the first stage of which includes a pair of relay contacts and an armature positioned adjacent thereto and having a power supply connected thereto, and the succeeding stages of which include pairs of contacts equal in number to twice that of the immediately preceding stage and having an armature positioned adjacent each pair and wherein the armatures of each stage are ganged together and each is connected to a relay contact of the preceding stage, *n* flip-flops responsive to said pulse signals and each coupled to a different one of said stages, each of said flip-flops comprising:

(a) a relay coil coupled the armatures of one of said stages;

(b) a pair of input terminals;

(c) and means connecting one pair of contacts of each stage to the input terminals of the flip-flop coupled to that stage.

6. A relay flip-flop comprising:

(a) a relay coil having first and second end terminals and a center tap;

(b) first and second input terminals respectively connected through capacitors to said first and second end terminals;

(c) first and second relay contacts;

(d) a power supply;

(e) an armature connected to said power supply and selectively movable into engagement with said first contact in response to energization of said coil in a first direction and into engagement with said second contact in response to energization of said coil in a second direction;

(f) first and second opposed diodes connected respectively between said first and second end terminals and said center tap;

(g) third and fourth opposed diodes connected between said input terminals;

(h) means connected to said input terminals for selectively charging one of said capacitors through said first or second diode;

(i) a source of recurring pulse signals;

(j) and means applying said source of recurring pulses to the junction between said third and fourth diodes to discharge said capacitors through said coil.

7. The combination of claim 6 wherein said relay contacts are connected to said input terminals.

8. In combination, a power supply, a source of recurring pulse signals, a plurality of load devices and means responsive to said pulse signals for sequentially connecting each of said load devices to said power supply, said means comprising;

(a) a relay tree including *n* stages each of which contains at least one pair of relay contacts and a movable armature positioned adjacent thereto;

(b) *n* flip-flop means each including a relay coil coupled to the armatures of a different one of said stages and capable of being energized in first and second directions to cause said armatures to respectively engage first and second contacts of said pairs of relay contacts;

(c) and means connecting one pair of contacts in each stage to the relay coil coupled thereto for controlling the direction of energization thereof.

9. In combination with a source of recurring clock pulses and a plurality of load terminals, apparatus responsive to said clock pulses for sequentially energizing each of said load terminals, said apparatus including:

(a) a relay tree comprised of a plurality of cascaded stages, each stage including one or more ganged relay armatures, each armature having first and second contacts positioned adjacent thereto;

(b) a plurality of relay coils each coupled to the armatures of a different one of said plurality of stages for respectively moving said armatures into engagement with said first and second contacts in response to the application of first and second signals thereto;

(c) means coupled to each of said relay coils and responsive to both the position of a selected one of the armatures coupled thereto and to said clock pulses for applying said first signal to relay coils coupled to selected armatures engaged with a second contact and said second signal to relay coils coupled to selected armatures engaged with a first contact.

References Cited by the Examiner

UNITED STATES PATENTS

| | | | |
|---|---|---|---|
| 2,581,273 | 1/1952 | Miller | 307—88.5 |
| 2,992,384 | 7/1961 | Malbrain | 324—78 |
| 3,011,122 | 11/1961 | McKenna | 324—68 |

LLOYD McCOLLUM, *Primary Examiner.*

FREDERICK M. STRADER, *Examiner.*